(12) United States Patent
Sorensen et al.

(10) Patent No.: US 7,691,909 B2
(45) Date of Patent: Apr. 6, 2010

(54) AEROSOL GELS

(75) Inventors: Christopher M. Sorensen, Manhattan, KS (US); Amitabha Chakrabarti, Manhattan, KS (US); Rajan Dhaubhadel, Manhattan, KS (US); Corey Gerving, West Point, NY (US)

(73) Assignee: Kansas State University Research Foundation, Manhattan, KS (US)

( * ) Notice: Subject to any disclaimer, the term of this patent is extended or adjusted under 35 U.S.C. 154(b) by 407 days.

(21) Appl. No.: 11/690,576

(22) Filed: Mar. 23, 2007

(65) Prior Publication Data

US 2007/0166222 A1 Jul. 19, 2007

Related U.S. Application Data

(63) Continuation-in-part of application No. PCT/US2005/033832, filed on Sep. 20, 2005.

(60) Provisional application No. 60/613,027, filed on Sep. 24, 2004.

(51) Int. Cl.
*B01F 3/06* (2006.01)
(52) U.S. Cl. .................. 516/32; 516/1; 516/2; 516/10; 516/31; 516/922; 516/924
(58) Field of Classification Search .................. 516/32, 516/1, 2, 10, 31, 922, 924
See application file for complete search history.

(56) References Cited

U.S. PATENT DOCUMENTS

| 3,920,865 A | 11/1975 | Laufer et al. |
| 4,150,101 A | 4/1979 | Schmidt et al. |
| 5,313,485 A | 5/1994 | Hamil et al. |
| 5,601,938 A | 2/1997 | Mayer et al. |
| 6,296,678 B1 | 10/2001 | Merzbacher et al. |
| 6,485,805 B1 | 11/2002 | Smith et al. |
| 7,005,181 B2 | 2/2006 | Albert et al. |
| 2003/0022389 A1 | 1/2003 | Miller et al. |
| 2004/0029982 A1 | 2/2004 | Erkey et al. |
| 2004/0159849 A1 | 8/2004 | Negley |
| 2005/0064279 A1 | 3/2005 | Struthers et al. |
| 2005/0131163 A1 | 6/2005 | Rhine et al. |
| 2006/0116463 A1 | 6/2006 | Erkey et al. |

FOREIGN PATENT DOCUMENTS

| EP | 0884376 A2 | 12/1998 |
| JP | 9-202610 | 8/1997 |
| JP | 2000-265390 | 9/2000 |
| JP | 2001-72408 | 3/2001 |
| WO | WO2004009673 | 1/2004 |
| WO | WO2005045977 | 5/2005 |

OTHER PUBLICATIONS

Lushnikov, A.A. et al., Experimental observation of the aerosol-aerogel transition, Chemical Physics Letters, vol. 175, No. 1,2; Nov. 30, 1990.
Sorensen, C.M. et al., Aerogelation in a Flame Soot Aerosol, Physical Review Letters, vol. 80, No. 8, Feb. 23, 1998.

*Primary Examiner*—Timothy J. Kugel
(74) *Attorney, Agent, or Firm*—Hovey Williams LLP

(57) ABSTRACT

An improved process for the production of ultralow density, high specific surface area gel products is provided which comprises providing, in an enclosed chamber, a mixture made up of small particles of material suspended in gas; the particles are then caused to aggregate in the chamber to form ramified fractal aggregate gels. The particles should have a radius (a) of up to about 50 nm and the aerosol should have a volume fraction ($f_v$) of at least $10^{-4}$. In preferred practice, the mixture is created by a spark-induced explosion of a precursor material (e.g., a hydrocarbon) and oxygen within the chamber. New compositions of matter are disclosed having densities below 3.0 mg/cc.

26 Claims, 3 Drawing Sheets

AEROSOL GELS

CROSS-REFERENCE TO RELATED APPLICATION

Figure 1:
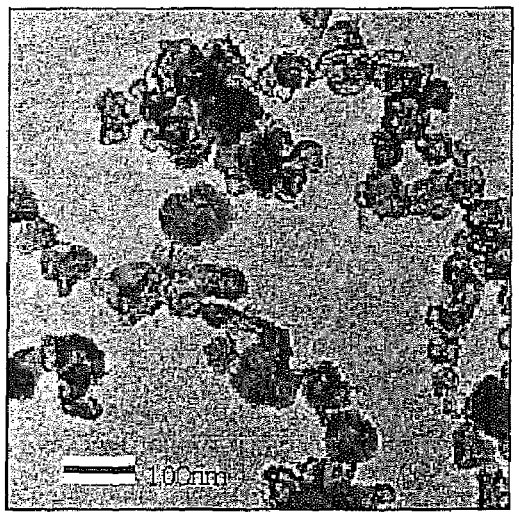

This application is a continuation-in-part of International Application PCT/US2005/033832, filed Sep. 20, 2005, which claims the benefit of Provisional Application Ser. No. 60/613,027, filed Sep. 24, 2004. All of the foregoing applications are incorporated by reference herein.

FEDERALLY SPONSORED RESEARCH/DEVELOPMENT PROGRAM

This invention was made with government support under NSF Grant No. CTS0080017 and NASA Grant No. 3-2360 awarded by the United States Army Research Office. The government has certain rights in the invention.

BACKGROUND OF THE INVENTION

1. Field of the Invention

The present invention is broadly concerned with new processes for the formation of low-density, high surface area gel products. More particularly, the invention is directed to such methods and the novel gel products themselves, wherein the gel products are formed in an enclosed chamber containing a mixture including particles of material suspended in gas under conditions to cause the particles to aggregate within the chamber and form a gel. Products may be produced having unprecedentedly low densities below 3.0 mg/cc. Gel products can be formed from virtually any starting material, provided that appropriate gelling conditions are established within the chamber.

2. Description of the Prior Art

Aerogels are a class of solid materials, produced through the sol-gel process, that are generally characterized by a fragile skeletal structure defining highly-accessible, branched mesopores. In contrast to other mesopore materials, aerogels represent a very unique and exciting class of solid materials exhibiting amorphous structures, extremely low apparent densities (with up to 95% of their volume occupied by air), high inner surface areas, and the potential to be formed into monoliths. Husing and Ulrich present a working definition of aerogels as "... materials in which the typical structure of the pores and the network is largely maintained while the pore liquid of a gel is replaced by air." Aerogels have very unusual properties. For example, $SiO_2$ aerogels have a high transparency that is close to that of glass, a thermal conductivity corresponding to that of polystyrene or polyurethane foams, and very high specific surface areas. The unique feature of aerogels is the combination of these physical properties in one material. Aerogels are made via a liquid phase sol-gel process. In order to remove the solvent liquid from the pores of the wet gel (produced during the sol-gel process) without damaging the fragile skeletal network, very special drying techniques must be employed. This is typically accomplished through a supercritical drying process, in which the wet gel (immersed in the solvent material) is placed and sealed in a pressure vessel (autoclave). The temperature and pressure of the autoclave are then increased and adjusted to a point above the critical point of the solvent. The solvent material is then vented out of the pressure vessel while holding the temperature constant. Although significant shrinkage of the network typically occurs during the supercritical drying process, the remaining 3-D solid aerogel monolith remains structurally intact, Regardless of the specific processes used, the current state of the art of aerogel production is critically dependent on the liquid-based sol-gel process and, more importantly, the complex supercritical drying process necessary to remove the gel liquid without damaging the network structure.

Silica aerogels are by far the most well-developed and extensively studied of all aerogel materials. Traditionally, silica aerogels are produced via a base-catalyzed reaction of TMOS (tetramethoxysilane) or TEOS (tetraethoxysilane), usually with ammonia as the catalyst. Once gelation is complete, the resulting liquid in the wet gel is then removed via supercritical drying. The type and concentration of the precursors, the relative concentrations, the type of solvent, the temperature, and the pH of the sol-gel process all have a definitive effect on the resulting structure and properties of the silica aerogel.

A relatively new class of aerogel materials, organic aerogels, are formed through the polymerization of resorcinol/formaldehlyde (RF) or melamine/formaldehlyde (MF) precursors via the sol-gel process, followed by supercritical drying. The key variables determining the structure and properties of organic aerogels are the catalyst concentration and the pH of the solution. Carbon aerogels are then prepared by pyrolysis of organic aerogels in an inert gaseous environment at temperatures ranging from 600 to 1100° C., producing a solid carbon aerogel monolith. Carbon aerogels represent a unique and exciting class of aerogel materials due to the fact that they are the first electrically conductive aerogel materials. For example, carbon aerogels have densities ($mg/cm^3$) of 100-600, surface areas ($m^2/g$) of 400-1,000, average pore sizes (nm) of 4-30, and electrical conductivities ($W/cm^2$) of 1-10.

The excellent electrical conductivities of carbon aerogels, along with their high inner surface areas, make them candidates for electrodes in electrical and electro-chemical applications. Currently, one of the most promising of these applications is in the development of electro-chemical double-layer capacitors (EDLCs), also known as supercapacitors or ultracapacitors. These devices are characterized by moderate energies and high power densities and are used in such applications as backup power supplies and on-demand peak power sources, where it is required to reversibly capture a large quantity of electric charge. Due to their high inner surface areas and highly interconnected network structures, carbon aerogels are currently the most promising new material for this application.

In addition to their superior electrical conductivity properties, carbon aerogel materials also show great promise in certain applications as thermal insulators. Although materials such as silica aerogels have long been identified as perhaps the best thermal insulators available, carbon aerogels are also very attractive in this arena. Total thermal conductivity is comprised of solid, gaseous, and radiative conductivities. The extremely low overall thermal conductivities of all aerogel materials is due partly to their high pore contents causing their solid thermal conductivities to be very low. On the other hand, the very small sizes of their pores cause their gaseous conductivities to also be quite low. Black (or highly opaque) carbon aerogels, in contrast to their silica-based counterparts, have very high IR extinctions and therefore possess much lower radiative thermal conductivities. This thermal feature of carbon aerogels makes them prime candidates for a wide variety of thermal insulation applications.

In 1998 Sorensen and coworkers demonstrated for the first time that aerosols could gel. The system was a simple acetylene/air diffusion flame in which the carbonaceous soot formed a macroscopic gel network. Soot is composed of ca.

50 nm spherical monomers, or primary particles. In a flame, these particles are at a high number density so that aggregation to fractal aggregates occurs rapidly. These aggregates form by a process called diffusion limited cluster aggregation (DLCA) and have a fractal dimension of D>1.8. Such aggregates are usually the final product in most flames, but Sorensen et al. showed that the heavily sooting acetylene flame had a volume fraction of soot roughly two orders of magnitude higher than flames for most other fuels. Thus they concluded that the rate of soot growth in the acetylene flame was five orders of magnitude faster, fast enough to form a gel in the flame.

Background references describing low-density aerogels include: U.S. Pat. Nos. 4,150,101; 5,313,485; 5,601,938; 6,296,678; 6,485,805; and 7,005,181; U.S. Published Patent Applications Nos. 2003/0022389; 2004/0029982; 2004/0159849; 2005/0064279; 2005/0131163; 2006/0116463; and foreign references EP 884376; JP 09202610; JP 2000265390; JP 2001072408; WO 2004/009673; and WO 2005/045977.

SUMMARY OF THE INVENTION

The present invention overcomes the problems outlined above and provides new processes in the production of gels. The process yields highly desirable low density, high surface area ramified fractal aggregate gels, while completely avoiding the time consuming and difficult solvent removal steps of the prior art. Broadly speaking, the methods of the invention comprise providing, in an enclosed chamber, a mixture made up of a plurality of particles of material suspended in a gas. The particles should have an average radius (a) of up to about 50 nm, while the aerosol should have a volume fraction ($f_v$) of at least about $10^{-4}$. As used herein, "average radius" refers to the average radius of the particles of material in the chamber at a time prior to aggregation. "Volume fraction" refers to the volume of the solid particles in the chamber divided by the volume of the gas therein. For example, in methods involving explosive formation of the mixtures, the average radius and volume fraction would be, respectively, the average radius of the particles at the instant after the explosion, and the volume fraction at that same instant.

In more preferred aspects of the process, the particles are allowed to aggregate under essentially quiescent conditions in the chamber. Although variable depending upon the nature of the particles in the chamber, generally the quiescent aggregation period should be at least about 10 minutes, for example, from about 10 minutes to 2 hours. In order to achieve the most rapid gel formation, the particles in the mixture should have an average radius of up to about 20 nm, and more preferably up to about 10 nm. The particles of material can be essentially pure (i.e., only a single material), or the particles can be made up of different materials. Particularly good results are obtained when the particles are of carbon-containing materials such as particles derived from a C2-C12 hydrocarbon, or more preferable a C2-C8 hydrocarbon.

The most preferred technique for mixture formation involves explosive generation thereof in the chamber, typically as an aerosol. This is accomplished by providing in the chamber an explosive mixture made up of the precursor to the particles of material and oxygen (pure oxygen or an oxygen-containing mixture such as air). At this point the explosive mixture is ignited, for example by generation of a spark within the chamber. Inasmuch as the preferred process involves explosive generation of a gas-particle aerosol, followed by aggregation of the particles, the resultive product can sometimes be referred to as "aerosol gels."

The invention also relates to new compositions of matter having extremely low densities. Indeed, in accordance with the invention, compositions of matter can be produced having densities below 3.0 mg/cc, more preferably from about 2.1 to less than 3.0 mg/cc, and most preferably from about 2.1-2.9 mg/cc, lower than any previously recorded solid and/or non-naturally occurring material. These compositions preferably include a fraction which is not silicon dioxide, and are advantageously entirely free of silicon dioxide. In one embodiment, the compositions comprise less than about 25% by weight silicon dioxide, more preferably less than about 10% by weight silicon dioxide, and most preferably less than about 1% by weight silicon dioxide. In another embodiment, the compositions preferably include a non-silicon dioxide fraction, more preferably consist essentially of material different than silicon dioxide, and most preferably are entirely free of silicon dioxide. The compositions are normally in the form of a ramified fractal aggregate and may have BET surface areas in the range of from about 100-400 $m^2/g$. In addition, the products hereof exhibit a unique electrical conductivity, i.e., the solid products have an electrical conductivity which is proportional to the square of the densities thereof. This is exhibited by compressing the products to alter the conductivities thereof in a quadratic fashion.

The products of the invention can be used in a variety of valuable contexts. This would include the known utilities of aerogels such as in insulators, acoustical barriers, high performance electrodes, catalyst supports, filter media, and absorbants. The methods of the invention are particularly important in that aerogel-type materials can be fabricated without the need for supercritical drying.

BRIEF DESCRIPTION OF THE DRAWINGS

FIG. 1 is a transmission electron microscope (TEM) photograph of the acetylene-derived gel produced in accordance with the invention;

FIG. 2 is a TEM photograph of the ethylene-derived gel produced in accordance with the invention;

FIG. 3 is a TEM photograph of the propane-derived gel produced in accordance with the invention;

FIG. 4 is a log-log plot of conductivity versus density for carbon gels at room temperature, exhibiting quadratic variation of conductivity with density (the thick line represents the conductivity of prior art carbon aerogels); and FIG. 5 is a plot of gelation time ($t_{gel}$) versus volume fraction ($f_v$) for carbon particles at average radii of 1, 10 and 100 nm.

DETAILED DESCRIPTION OF THE PREFERRED EMBODIMENT

The present invention provides novel methods and gel products exhibiting high specific surface areas coupled with extremely low densities. Essentially any system of particles under controlled conditions can aggregate to form gels in accordance with the invention. The invention involves controlling system conditions so that the aggregating particles will form ramified fractal aggregates with fractal dimensions (D) less than their spatial dimensions (d). When (D) is less than (d), the average cluster separation over cluster size falls with time during aggregation until the separation equals the size. Then the clusters join together to form a gel. However, the desired aggregation must be distinguished from coalescence, involving the merger of monomers into a homogeneous-type structure; such coalescence must be avoided.

A simple calculation can be used to approximate the sizes of the aggregates when, they grow large enough to gel, and the time it takes to create a gel. A reasonable approximation for when the particulate system gels is when the monomer number density in the average cluster is equal to the monomer number density in the entire system, i.e., $$n(c)=n(s) \quad (1)$$

For a fractal aggregate (cluster) the number of monomers of radius "a" in a cluster of radius R is approximately $$N=(R/a)^D. \quad (2)$$

Then the monomer density in the cluster is $$n(c) = N/V \quad (3)$$
$$= N/R^d$$
$$= R^{D-d}/a^D$$

The system monomer number density is related to the particulate volume fraction $f_v$ by $$f_v = n(s)a^d. \quad (4)$$

Then Eqs. (1), (3) and (4) yield the size of the cluster at the gel point $$R_{gel} = a f_v^{\frac{1}{D-d}}. \quad (5)$$

For d=3 and the DLCA D=1.8 this is $$R_{gel} = a f_v^{-5/6}. \quad (6)$$

The gel time is the time to grow to $R_{gel}$. Kinetics of growth are governed by the Smoluchowski equation which in its simplest form is $$\frac{dnc}{dt} = -K n_c^2. \quad (7)$$

In (7) $n_c$ is the number density of clusters and K is the aggregation constant. The long time solution to (7) is $$n_c(t)=(Kt)^{-1} \quad (8)$$

The cluster and monomer number densities are related by $$n(s)=N n_c. \quad (9)$$

n(s) is a constant and N and nc vary with time. The gel time can be found by setting the number of monomers per cluster N to its value at the gel point through Eqs.(2) and (5)

$$N_{gel}=(R_{gel}/a)^D. \quad (10)$$

Then combining Eqs.(4), (5), (8), (9) and (10) one can find the gel time $$t_{gel} = K^{-1} \frac{a^3}{f_v^{\frac{d}{D-d}}}. \quad (11)$$

For d=3 and D=1.8 (a widely applicable physical constant) equation (11) becomes $$t_{gel} = K^{-1} \frac{a^3}{f_v^{2.5}}. \quad (12)$$

Figure 5:
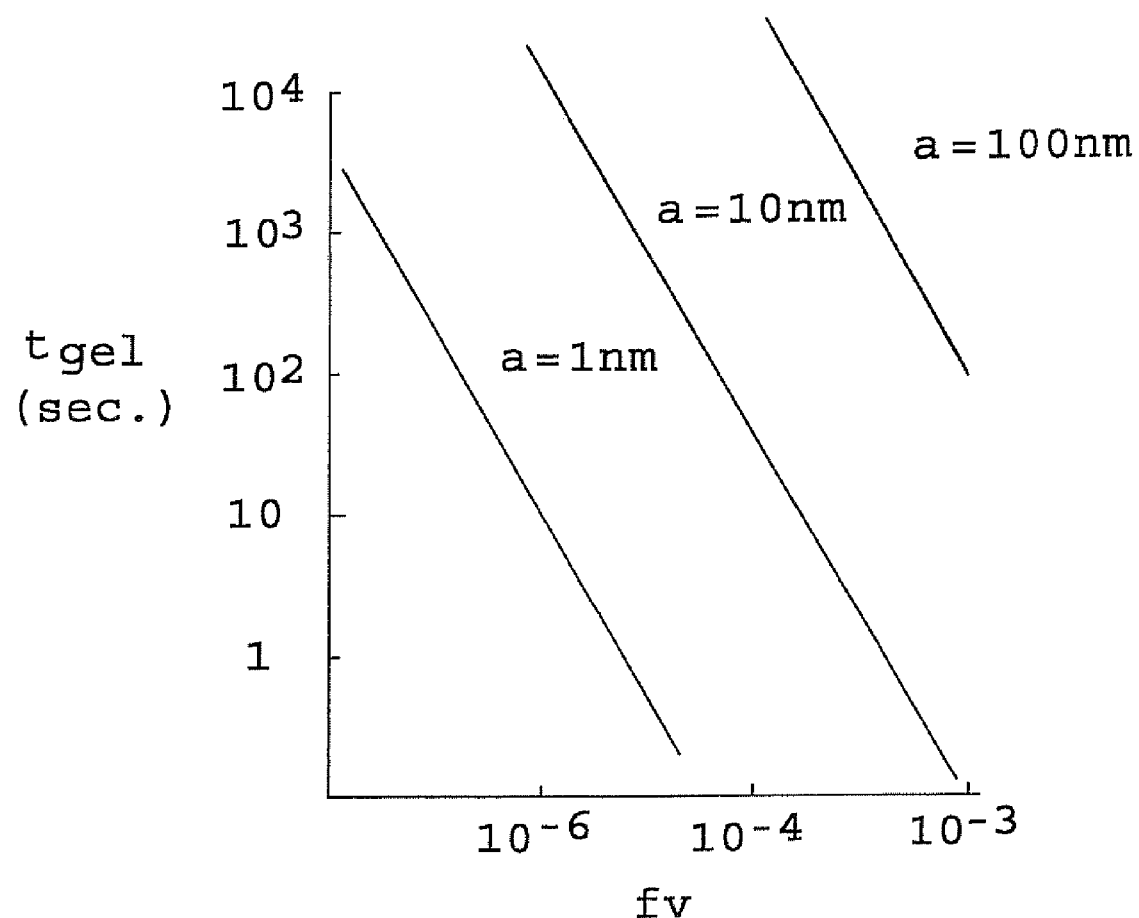

Equation (12) confirms that if a is small and $f_v$ is large, I.e., the system contains a lot of finely divided matter, the system will gel rapidly. Moreover, functionality of a and $f_v$ are very strong. Equation (12) is plotted in FIG. 5, using the aggregation constant K for air at STP (K=3×10$^{-10}$ cm$^3$/s), using monomer radii of 1, 10 and 100 nm. FIG. 5 illustrates that an aerosol can gel quickly, within 100 seconds or less, if a is less than or equal to about 10 nm for $f_v$ values of around 10$^{-4}$. Courser aerosols at lower $f_v$ have very large gel times and essentially never gel.

Accordingly, in order to achieve the desired gel products of the invention, conditions need to be established with particles having small a values and the overall mixture having relatively large $f_v$ values. Small monomers (and thus resulting small a values) can be achieved with fast gas phase and solid phase chemical reactions. Large volume fractions can be obtained if the gas phase is efficiently converted to the solid phase. A typical volume of gas at atmospheric pressure, if condensed to a solid phase, would have a volume fraction of about 10$^{-3}$.

Given all of the foregoing considerations, it is believed that any material should form a gel in accordance with the invention if a is sufficiently small (up to about 50 nm, more preferably up to about 20 nm, and most preferably up to about 10 nm), and $f_v$ is sufficiently large, at least about 10$^{-4}$, and more preferably at least 10$^{-3}$. Exemplary starting materials suitable for processing pursuant to the invention include hydrocarbons, transition metal compounds (e.g., transition metal oxides, carbides and sulfides), cadmium chalcedonies, and gallium and indium arsenides and antiminides.

The following examples set forth presently preferred techniques for the production of carbon gels in accordance with the invention. It is to be understood, however, that these examples are provided by way of illustration only, and nothing therein should be taken as a limitation upon the overall scope of the invention.

EXAMPLE 1

A series of carbon gels were produced using a 17-liter closed combustion chamber. In each instance, an explosive mixture of liquid or gaseous hydrocarbon and oxygen (e.g., 2 parts acetylene by volume/1 part oxygen by volume) were introduced into the chamber at up to 1 atmosphere pressure at room temperature. The gaseous hydrocarbons were injected as a gas, whereas the liquid hydrocarbons were injected as a liquid aerosol (oxygen) mist having an average particle size estimated to be on the order of 1 micron.

A conventional spark plug having its electrode within the chamber was used to ignite the mixture; the spark was generated using a Tesla coil coupled to the spark plug. Generation of the spark caused an instantaneous explosion which rapidly produced nanometer-sized (up to about 50 nm) carbon particles, which quickly aggregated to form ramified fractal carbon structures. After the explosion, the material within the chamber was allowed to sit quiescently for a period of about 2 hours, to allow the carbon aggregates to settle undisturbed within the chamber. After opening the chamber, the resultant aerosol gels appeared as dark black and fluffy carbon layers on the inner surfaces of the chamber. The layer was observed to be about 2 cm thick for acetylene and up to about 3 mm for the other hydrocarbon fuels.

The following table sets forth the upper and lower explosive limits (LEL and HEL) for the hydrocarbons used in this series of tests (an explosion only occurs when the hydrocarbon concentration is between the LEL and HEL limits):

TABLE 1

| Hydrocarbon | LEL (% by volume) | HEL (% by volume) |
| --- | --- | --- |
| Acetylene | 11 | 95 |
| Ethylene | 12 | 74 |
| Propane | 10 | 34 |
| Pentane | 6 | 29 |
| Hexane | 5 | 28 |
| Isooctane | 5 | 23 |

TABLE 2

The densities of the gels produced in these tests are set forth below.

| Hydrocarbon | Density Measurement | | |
| --- | --- | --- | --- |
| | Lowest (mg/cc) | Highest (mg/cc) | Average (mg/cc) |
| Gaseous | | | |
| Acetylene | 3.5 | 6.5 | 5.0 |
| Ethylene | 2.3 | 3.5 | 2.9 |
| Propane | 2.1 | 3.3 | 2.7 |
| Liquid | | | |
| Pentane | 2.4 | 8.6 | 5.1 |
| Hexane | 4.7 | 5.4 | 4.9 |
| Isooctane | 2.3 | 11.2 | 5.8 |

Figure 2:
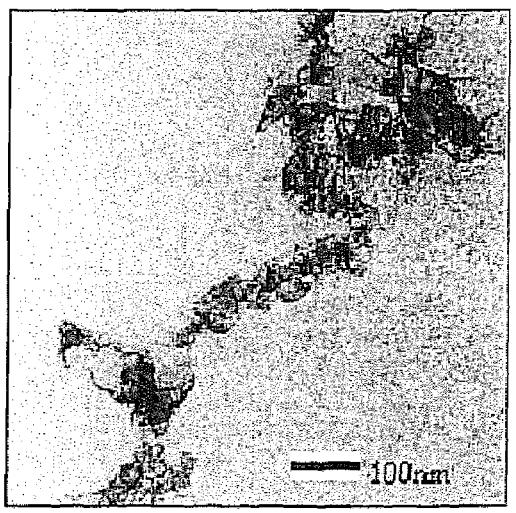
Figure 3:
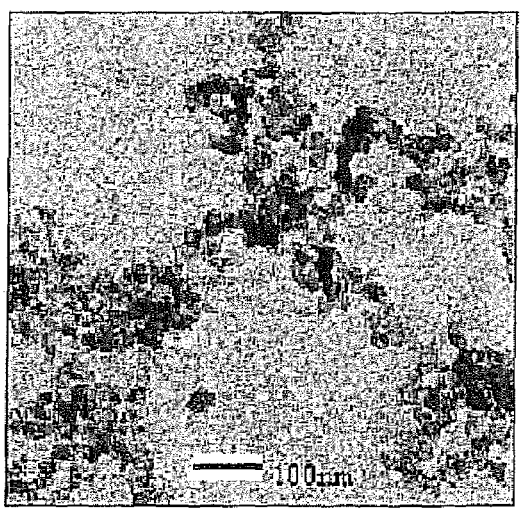

FIGS. 1-3 are TEM photographs of the acetylene-, ethylene-, and propane-derived gel products, respectively. These photographs illustrate that the carbon monomers are graphitic in nature. Acetylene and ethylene products both ha-e monomers with typical sizes of about 60 nm.

The propane products exhibited a smaller monomer size, on the order of 20 nm. Monomers of the acetylene and propane gels are more or less polygonal in structure, whereas the ethylene gel monomers have thin surfaces with thick borders.

Cluster morphology was determined from the TEM photographs by three different methods: correlation function, structure factor and perimeter analyses. When analyzed on the scale of the monomer size (~60 nm diameter) up to ca. 1 micron, the carbon clusters were found to have a fractal dimension of 1.75±0.05 via all three analyses. Analysis of cluster morphology over length scales from ca. 1 micron to 50 microns with the perimeter analysis method, which is the only viable method when D>2, yielded a fractal dimension of D=2.6±0.2. These results imply superaggregates with DLCA and percolation morphologies consistent with previously reported results for gelation in flames.

XRD analysis of the carbon aerosol gels showed characteristic graphitic carbon. Scherrer analysis of line broadening yielded crystallite sizes of about 4 nm. This is a fraction of the monomer particle sizes and hence consistent with the apparently graphitic domains within the monomers seen in the TEM photographs. Thermal gravimetric analyses of the products showed no volatiles up to 600° C.

BET surface area results for several of the aerosol gels are given in Table 3.

TABLE 3

| Hydrocarbon | Specific Surface Area (m$^2$/g) |
| --- | --- |
| Acetylene | 400 |
| Ethylene | 310 |
| Propane | 140 |

Another specific acetylene-derived gel exhibited a BET surface area of 190 m$^2$/g, with a mean pore size of 11.8 nm.

The carbon gels of the invention are hydrophobic, and are not wettable with water. However, the gels wet with toluene, which is absorbed into the gels.

The carbon gels are fragile, but can withstand up to about 20 times their weight of top pressure. The carbon gels can be hand compressed to change their densities. For example, uncompressed products may have a density of approximately 4 mg/cc; very light compression of the products yields a density of about 15 mg/cc; compressed products have a density of about 102 mg/cc; heavily compressed products have a density of about 197 mg/cc; and very heavily compressed products have a density of about 307 mg/cc. It was surprising to note that these densities were at least in order of magnitude lower than graphite (2250 mg/cc) regardless of how hard the products of the invention were hand compressed.

Figure 4:
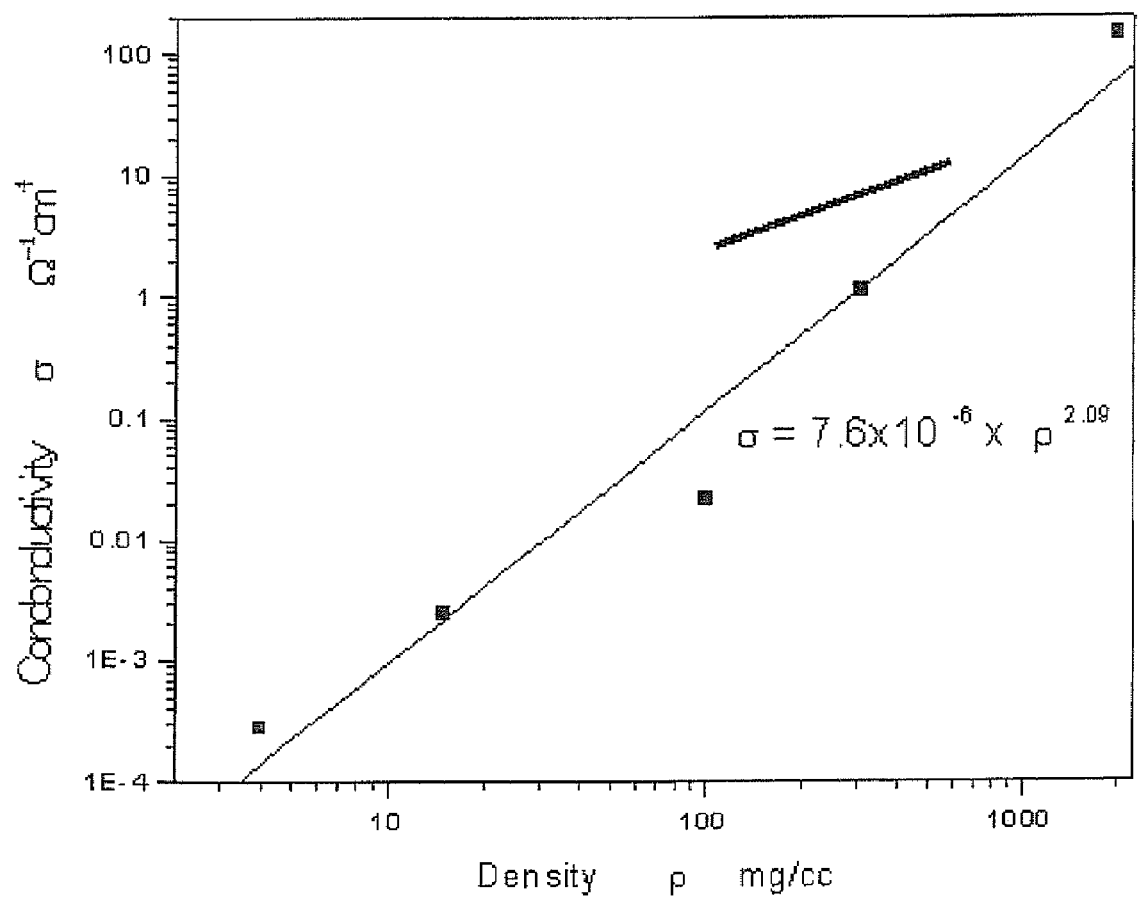

Preliminary electrical conductivity measurements were carried out on the products, and it was discovered that they exhibit ohmic conductivities from 0-10 volts. However, the conductivity increases quadratically with density (changed by crushing with pressure). This is unusual because most materials exhibit a linear dependence. FIG. 4 is a log-log plot of the conductivity versus density for the carbon products of the invention at room temperature. The conductivity of graphite is shown in the bold line for comparison purposes. The closed explosion gels of these examples exhibit significantly different properties as compared with flame-produced gels. The densities of the open-flame products are higher, typically on the order of 13 mg/cc. These flame gels are dark gray in color, as opposed to the dark black color of the explosion gels, indicating that the open-flame products may contain unburned hydrocarbons. Moreover, TEM photographs of the flame products show that the monomers are more rounded in shape and uniform without a graphitic nature. Monomer diameters in the flame products are on the order of 60 nm.

The extremely low densities of the gel products of the invention are unprecedented. The lowest density non-naturally occurring materials have densities of 3.0 mg/cc and above. However, the products hereof can exhibit densities below 3.0 mg/cc, and in many cases between below 2.5 and down to about 2.1 mg/cc.

EXAMPLE 2

Silica (SiO$_2$) aerosol gels were prepared by spontaneous explosive reaction of silane (SiH$_4$) with either oxygen (O$_2$) or nitrous oxide (N$_2$O). These reactions were performed in the presence of an inert background gas such as nitrogen (N$_2$) or carbon dioxide (CO$_2$), but otherwise the procedure used was the same as that set forth in Example 1 for the preparation of carbon aerosol gels. It is believed that the silica nanoparticles are in a molten state when they are formed, and therefore without inert background gas these nanoparticles will move balistically and "splash" on the chamber walls. Thus, the role of the inert background gas is to help in quickly quenching the fresh silica nanoparticles below the melting temperature thereof and before they collide with the chamber walls or each other. Typically, 0.46 moles of background gas was used in the 3.9 liter explosion chamber. About 0.016 moles of silane and 1.4 times the stoichiometric amount of oxygen was used in each reaction. Assuming 100% yield, this results in a silica volume fraction of approximately $10^{-4}$. This is the desired monomer volume fraction for gelation of nanoparticles undergoing Brownian aggregation and slow gravitational sedimentation. The resultant silica aerosol gels were very fluffy, translucent and bluish-white in color. The gels had densities in the range of 4.5-5.5 mg/cc and specific surface areas of 350-450 $m^2$/g. TEM analysis showed roughly spherical primary particles with an average diameter of 18.4±2.5 nm. XRD and electron diffraction images gave broad intensity spectrums indicating the amorphous nature of the silica aerosol gel monomers. These primary monomer particles are aggregated into chain-like fractal aggregates similar to the morphology seen with the carbon aerosol gels of Example 1.

We claim:

1. A method of forming a gel product comprising the steps of: providing in an enclosed chamber a mixture including a plurality of particles of material suspended in gas, said particles having an average radius (a) of up to about 50 nm and said mixture having a volume fraction (fv) of at least about $10^{-4}$; and causing said particles to aggregate within said chamber under quiescent conditions to form said gel product, said gel being formed by Brownian aggregation of said particles within said chamber.

2. The method of claim 1, said material comprising a carbon-containing material.

3. The method of claim 2, said material comprising carbon derived from a C2-C12 hydrocarbon.

4. The method of claim 3, said hydrocarbon selected from the group consisting of C2-C8 hydrocarbons.

5. The method of claim 1, said mixture being explosively generated in said chamber.

6. The method of claim 5, said mixture being generated by the steps comprising providing in said chamber an explosive mixture of a precursor to said particles of material and oxygen, and exploding said mixture.

7. The method of claim 6, said exploding step comprising the step of generating a spark within said chamber.

8. The method of claim 1, including the step of allowing said particles to aggregate for a period of at least about 10 minutes.

9. The method of claim 8, the period being from about 10 minutes to 2 hours.

10. The method of claim 1, said radius being up to about 20 nm.

11. The method of claim 1, said method being a batch method.

12. The method of claim 1, said material being only a single material.

13. The method of claim 1, said particles comprising a plurality of particles made up of different materials.

14. The method of claim 1, said particles selected from the group consisting of carbon-, silicon-, and titanium-bearing particles and mixtures thereof.

15. A gel product produced by the method of claim 1.

16. A composition of matter comprising a solid formed of carbon and having a density of less than 6.5 mg/cc.

17. The composition of matter of claim 16, said composition including a fraction not composed of silicon dioxide.

18. The composition of matter of claim 17, said composition being essentially free of silicon dioxide.

19. The composition of matter of claim 16, said density ranging from about 2.1 to less than 3.0 mg/cc.

20. The composition of matter of claim 16, said solid having a BET surface area of from about 100-400 $m^2$/g.

21. The composition of matter of claim 16, said solid being a ramified fractal aggregate gel.

22. The composition of matter of claim 16, said carbon being graphitic carbon.

23. A method of forming a gel product comprising the steps of: providing in an enclosed chamber a mixture including a plurality of particles of material suspended in gas, said particles having an average radius (a) of up to about 50 nm and said mixture having a volume fraction (fv) of at least about $10^{-4}$; and causing said particles to aggregate within said chamber and form said gel product, said mixture being explosively generated in said chamber.

24. The method of claim 23, said mixture being generated by the steps comprising providing in said chamber an explosive mixture of a precursor to said particles of material and oxygen, and exploding said mixture.

25. The method of claim 24, said exploding step comprising the step of generating a spark within said chamber.

26. A gel product produced by the method of claim 23.

* * * * *